March 22, 1966  J. P. CAPPS  3,241,236
GAME KNIFE
Filed Aug. 28, 1964
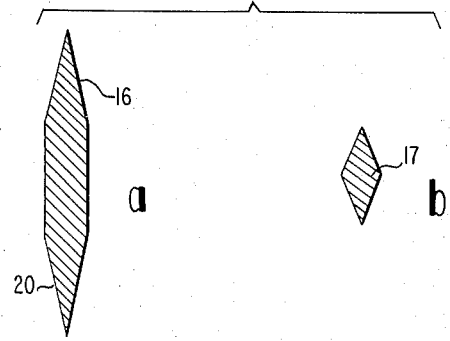
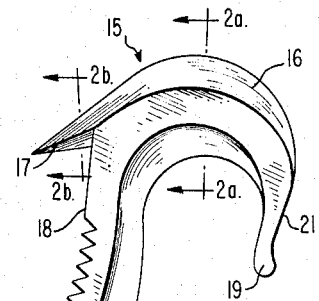
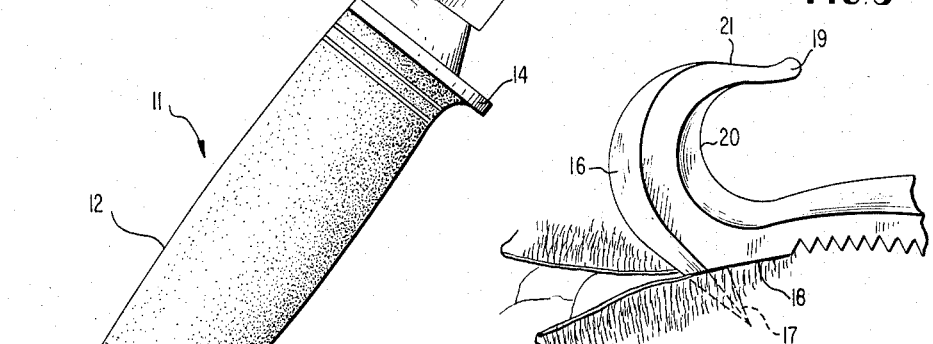
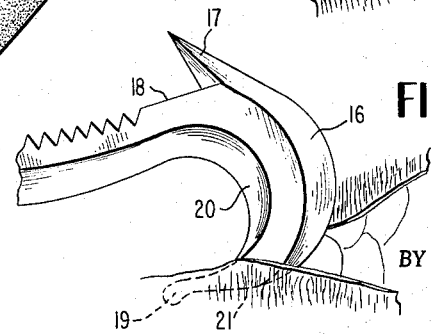
INVENTOR.
JAMES P. CAPPS
BY Dicke & Craig
ATTORNEYS United States Patent Office 3,241,236
Patented Mar. 22, 1966

3,241,236
GAME KNIFE
James P. Capps, P.O. Box 1157, Great Falls, Mont.
Filed Aug. 28, 1964, Ser. No. 392,846
5 Claims. (Cl. 30—287)

The present invention relates in general to knives, and more particularly, to an implement especially designed to perform the inherently complicated operations required for properly skinning and dressing game animals including fish, small game, and the large four-legged animals, such as deer, moose and elk.

During the pioneering days, the familiar single bladed hunting knife was required as much for self-protection against wild animals, unfriendly foes and other dangers to man as it was for relatively nondefensive purposes, such as, the skinning and cleaning of animals and other outdoor tasks requiring general cutting. Because of the defensive uses for the hunting knife, its design changed very little over the years and has to this day remained essentially unchanged in overall configuration from the knife used by the pioneers decades ago. However, since the inherent dangers to the hunter have been substantially entirely eliminated, the hunting knife has very little defensive use to the present-day hunter and so the time has come to replace the old single bladed hunting knife with one more suited to the particular functions for which it now is most commonly used.

The skinning and dressing of game animals has been accomplished with the old style single bladed hunting knife throughout the years; however, since this knife was designed more as a weapon than a tool, great skill was needed to effectively skin and dress an animal, and even the most skilled found it difficult to perform these tasks with efficiency and speed without damaging or spoiling the meat of the animal.

The rather thin blade of the old style hunting knife made it very difficult to cut through the various bones of the animal, including the pelvis bone, and the length of the blade made it very difficult to cut through the hide of the animal without puncturing the inner organs, which is known to materially hasten the spoiling of the meat in hot weather, and in any kind of weather, to leave an undesirable taste to the meat. In addition, removing the hide from the animal becomes a very slow and tedious process with the regular hunting knife, since care must be taken not to damage the meat while making the necessary long cuts in the hide. The long length of the blade of the regular hunting knife is difficult to control, and so even the most skilled find it difficult to quickly remove the hide without unnecessarily damaging the meat or the hide during the operation.

The present invention provides a game knife having a plurality of cooperating blade portions and guide portions, which have been specifically designed to perform the several operations of skinning and dressing of game animal with ease and accuracy, and with a simplicity that permits even the novice to rival the expert in the performance of these operations. The game knife of the instant invention is designed to perform all of the usual functions necessary to properly skin and dress most game animals, including fish, and additionally provides a regular knife blade edge which may be usde in the manner of the prior single bladed hunting knife.

The cutting tool of the instant invention consists of an elongated blade which is essentially crescent-shaped at one end thereof and is provided with a suitable handle at the other end. The crescent shaped portion of the blade carries a plurality of cutting edges and projections and additionally is provided with a pair of guide surfaces which serve to control the depth and direction of cutting of adjacent associated cutting surfaces. One of these guides is provided as a blunt end of the tip end of the crescent portion which, in the case of opening the chest cavity and stomach cavity of the animal, prevents the knife from pulling through the hide by providing at the inner surface of the hide a blunt guide positioned ahead of the cutting edge. In this way the hide may be ripped open in one long continuous cut with the backward and upward force necessary to effect such an operation cleanly and efficiently. At the same time, the blunt end serves to push the inner organs of the animal out of the way of the outer cutting edge of the knife, preventing damage to these organs, and also effects a separation of the meat and the hide just ahead of the cutting edge.

The back edge of the crescent at the point where it joins the straight portion of the blade is provided with a sharp pointed porjection adjacent to a flat guide surface. This sharp pointed projection protrdues beyond the flat guide surface by a distance sufficient only to cut through the hide of the animal and the flat guide surface prevents further penetration thereof. This point is therefore useful in making a starting cut for the reverse side of the knife, or to open fish, small game and to provide other cuts of a shallowed depth without the danger of accidentially cutting deeply at the wrong time and effecting damage to the meat or internal organs of the animal.

In addition to the inner cutting surface and the sharp pointed projection, the crescent-shaped portion of the blade is provided at the entire back edge thereof with a relatively heavy but very sharp blade, which may be used in ice pick fashion to chop through the pelvis bone and chest cavity of large animals. This rear blade may also be used to separate meat from hide, which is usually bound tight to one another.

The longitudinal portion of the blade between the handle and the crescent shaped end is provided on the inner edge thereof cooperating with the inner edge of the crescent with a knife edge useful in the fashion of the regular single bladed hunting knife to perform desirable cutting operations of any type. The rear edge of this longitudinal blade portion is provided with a square saw toothed edge which is useful to cut through the bones of large game animals, such as the legs, as is normally done in field dressing the animals. Again, the saw toothed edge like the knife blade edge may be used for normal cutting and sawing operations not related to the skinning and dressing of animals.

Each of the various cutting surfaces provided on the cutting tool of the instant invention are necessary during the skinning and dressing of a game animal, and each cooperate during the performance of these necessary functions to effect the completion of each operation with the accuracy and efficiency required. In addition, the location of the various cutting edges and guide surfaces in relation to the other portions of the tool necessarily require that all functions be carried out by the single tool.

It is therefore an object of the instant invention to provide a game knife which combines in a single cutting tool a plurality of cutting edges and guide surfaces which are adapted to cooperate in performing the functions necessary to properly skin and dress game animals.

It is another object of the instant invention to provide a game knife having cutting edges and cooperating guide surfaces which make possible cutting to a prescribed depth without danger of deeper penetration, which could result in damage to inner organs or deep cuts in the meat, which would affect the proper control of blood drainage from the meat while cooling out.

It is a further object of the present invention to provide a game knife which in addition to cutting and separating the hide of a game animal is capable of effecting the splitting of bones in large animals with ease and efficiency.

It is still another object of the instant invention to provide a game knife specially designed for the skinning and dressing of game animals which is small and compact, and yet is of sufficient weight and strength to perform the functions for which it has been designed with great ease and efficiency.

These and further objects, features and advantages of the present invention will become more obvious from the following description when taken in connection with the accompanying drawing which shows, for purposes of illustration only, one embodiment in accordance with the present invention, and wherein:

FIGURE 1 is a top plan view of the game knife of the instant invention;

FIGURE 2a is a cross section of the game knife illustrated in FIGURE 1 taken along the lines 2a—2a through the crescent-shaped end of the blade;

FIGURE 2b is a cross section of the game knife illustrated in FIGURE 1 taken along the line 2b—2b through the sharp pointed projection at the rear of the crescent-shaped portion of the blade;

FIGURE 2c is a cross section of the game knife illustrated in FIGURE 1 and taken along the line 2c—2c through the center longitudinal portion of the blade showing the cutting blade and the saw tooth blade;

FIGURE 3 illustrates in perspective view the manner in which the sharp pointed projecting blade and its associated guide surface cooperate to effect a cut through the hide of the animal; and FIGURE 4 illustrates in perspective the manner in which the inner cutting edge, blunt point and flat guide surface of the crescent-shaped portion of the cutting blade cooperate to effect the necessary cut in the hide of a game animal.

Referring now to the drawing wherein like reference numerals are used throughout the various views to designate like parts, and more particularly to FIGURE 1, reference numeral 10 generally designates the blade of the game knife which carries the various cutting edges and guide surfaces required for a proper skinning and dressing of the game animal. The blade 10 is provided at one end with a handle 11 which may be of any suitable construction so as to be conveniently and readily grasped and held in the hand of the user, and which in the illustrated embodiment, consists of a laminated leather handle 12 having a metal tip 13 and a metal stop and hand guard 14. The blade 10, which is preferably of cold roll steel, is riveted or otherwise suitably secured to the handle 11 so as to be firmly attached thereto. It is also within the contemplation of the invention that the handle be made of metal so as to materially increase the weight of the knife thereby facilitating its use as a means for chopping through large heavy bones of the animal. Such a metal handle could be suitably riveted or welded to the blade 10, or the handle could be provided as an integral part of the blade itself.

The blade 10 is provided with a crescent-shaped portion at one end thereof generally designated 15 in FIGURE 1. A cutting edge 16 is provided at the outer periphery of the crescent-shaped portion 15 and is essentially located diametrically opposite from the handle 12 to facilitate its use in ice pick fashion to split the pelvis bone of large animals. For this reason, the entire knife and especially the crescent-shaped head portion, should be reasonably heavy to facilitate the chopping so as to effect a clean split of the pelvis bone. It is therefore necessary that the cutting edge 16 be relatively blunt in shape to withstand and absorb the forces produced by this chopping action; however, the edge should also be sufficiently sharp to penetrate and split the pelvis bone with relatively few blows.

The cutting edge 16 extends around the periphery of the crescent-shaped portion 15 and merges into a sharp pointed projection 17 extending substantially tangential to the crescent. This sharp pointed projection 17 cooperates with a flat guide portion 18 extending from the projection 17 along the back edge of the blade 10 toward the handle 11. As seen in FIGURE 3, the guide surface 18 serves to control the depth to which the blade 17 will penetrate, preventing penetration to a greater extent than the length of the sharp pointed projection 17. FIGURE 2b shows that the projection 17 is diamond shaped tapering to a sharp point which is capable of easily penetrating the hide of the animal and is especially useful in making a starting cut in the hide so that the main ripping portion of the knife may be inserted and utilized to continue the longitudinal cut which must be effected preliminary to skinning of the animal. Due to its extremely sharp point, the projection 17 is also useful to open fish and other small game for purposes of cleaning.

The crescent-shaped portion 15 of the blade is also provided at the free end thereof with a blunt point 19 which cooperates with a cutting edge 20 at the inner periphery of the crescent-shaped blade portion 15. The cutting edge 20 and the blunt guide point 19 cooperate to form a hook which is effective to cut through the chest cavity of a deer or other game animal, as is illustrated in FIGURE 4. The blunt end 19 and a cooperating flat edge 21 extending from the point 19 toward the edge 16 on the outer periphery of the crescent-shaped blade portion 15 serves to guide the blade during the cut by preventing the blade from pulling free of the hide when upward force is exerted thereon and also preventing danger of damage to the meat or inner organs of the animal. As seen in FIGURE 4, the cut with the blade portion 20 and guide portions 19 and 21 is effected by inserting the blunt end 19 in the starting cut in the hide made by the sharp pointed projection 17, and the knife is then pulled with an even stroke upward and backward toward the user thereby effecting a clean cutting of the hide in one long longitudinal cut.

In removing the hide from the animal after the longitudinal cut with the edge 20 has been effected, the blunt point 19 and cutting edge 16 are used to separate the meat from the hide. The blunt end 19 prevents damage to the meat and the flat configuration of the crescent-shaped blade portion 15 slips easily between the meat and the hide to effect a clean cut without damage to either the meat or the hide. During this operation, one hand is used to pull the hide away from the meat while the other hand manipulates the game knife so as to draw the cutting edge 16 along the edge between the meat and the hide. Each downward stroke of the knife may be effected quickly and cleanly since the blunt point 19 will prevent gouging of the meat.

The longitudinal portion of the blade 10 is provided at the inner surface thereof with a blade cutting edge 22 which extends from the metal hand guard 14 of the handle 11 and merges at the other end of the blade with the cutting portion 20. This blade cutting edge 22 serves the purpose of the single bladed hunting knife of the prior art and may be used for any cutting operation previously performed by this prior art knife. In addition, the outer edge of the longitudinal portion of the cutting blade 10 is provided with a saw tooth cutting edge 23 which is useful to cut through bones, such as the lower leg portion of the larger game animals as is often done in field dressing the animal. As can be seen in FIGURE 2c, being square in shape rather than sharpened to an edge. However, it is within the purview of the invention that this saw tooth edge may be designed as a sharpened edge or with a staggered tooth construction in the manner well-known in the art.

As should be clearly apparent from the above description of the instant invention, the provision of multiple specialized cutting edges for performing specialized functions relating to the skinning and dressing of game animals allows the hunter to work with much greater speed and less care for accuracy without sacrificing the quality of the skinning and dressing operation. In warm weather hunting, speed in dressing the animal is of utmost importance since the meat will spoil very quickly if the animal is not immediately dressed out. The knife in accordance with the instant invention permits a speed of operation not previously attainable with the straight-bladed hunting knife even by those having relatively little experience or skill.

I claim:

1. An implement for skinning and dressing game animals comprising blade means for effecting cutting at a controlled depth including a substantially elongated blade having a linear portion and a crescent-shaped end portion, handle means connected to the free end of said linear portion, said crescent-shaped end portion having at least a blunt rounded portion at the free end thereof and a sharpened inner peripheral edge portion, a substantially flat guide surface adjacent said blunt rounded portion extending for a minor portion of and on the outer periphery of said crescent-shaped end portion, and the remainder and the major portion of the outer periphery of said crescent-shaped end portion having a sharpened edge, which extends in a continuous arc transverse to said elongated blade, a sharp pointed projection communicating with and forming an integral continuous extension of said crescent-shaped end portion opposite the free end thereof, the outer edge of said projection being tangential to said crescent-shaped end portion at their junction and guide means having a second substantially flat guide surface forming an extension of said linear portion of said blade means adjacent said sharp pointed projection to serve as a guide for said projection and limit the depth of penetration of said projection when said projection is used in cutting.

2. An implement for skinning and dressing game animals comprising blade means for effecting cutting at a controlled depth including a substantially elongated blade having a linear portion and a crescent-shaped end portion, handle means connected to the free end of said linear portion, said crescent-shaped end portion having at least a blunt rounded portion at the free end thereof and a sharpened inner peripheral edge portion, and a substantially flat guide surface adjacent said blunt rounded portion on the outer peripehry of said crescent-shaped end portion, a sharp pointed projection communicating with and forming an integral continuous extension of said crescent-shaped end portion opposite the free end thereof, the outer edge of said projection being tangential to the outer edge of said crescent-shaped portion at their junction and guide means having a second substantially flat guide surface forming an extention of said linear portion of said blade means adjacent said sharp pointed projection to serve as a guide for said projection and limit the depth of penetration of said projection when said projection is used in cutting, the outer peripheral edge of said crescent-shaped end portion and said projection being sharpened and extending in a continuous arc substantially transversely to the longitudinal direction of said linear portion of said blade means and said handle means, one peripheral edge of said linear portion of said blade having a saw-tooth configuration and the other peripheral edge thereof having a sharpened edge merging with the sharpened inner periphery of said crescent-shaped portion.

3. An implement for skinning and dressing game animals comprising an elongated blade having a handle affixed securely to one end thereof, said blade having a crescent-shaped portion at the other end opposite said handle and a substantially linear portion extending between said handle and said crescent-shaped portion, a sharp pointed projection extending outwardly from said crescent-shaped portion merging tangentially with the outer periphery thereof and an essentially flat guide surface means between said projection and said linear portion to regulate the depth of penetartion of said projection, the inner periphery of said crescent-shaped portion having a sharpened edge and terminating at the free end of said portion in a blunt rounded guide portion, and the outer periphery of said projection and the outer periphery of said crescent-shaped portion adjacent to said projection having a sharpened edge extending in a substantially continuous arc transverse to said linear portion, said sharp pointed projection extending downwardly at an acute angle to said flat guide surface means toward said handle.

4. An implement for skinning and dressing game animals comprising:

blade means for effecting cutting at a controlled depth including a substantially elongated blade having a linear portion and a hook-like portion at one end, handle means connected to the other end of said linear portion opposite said hook-like portion, said hook-like portion having a blunt rounded portion at the free end thereof and a sharpened inner peripheral edge portion, a substantially flat guide surface means adjacent said blunt rounded portion on the outer periphery of said hook-like portion, a second sharpened edge portion on the outer periphery of said hook-like portion adjacent to said flat guide surface means opposite from said blunt rounded portion, said flat guide surface means to limit the depth of penetration of said second sharpened edge portion, a second pointed projection communicating with and forming an integral continuous extension of said hook-like shaped portion opposite the free end thereof, the outer edge of said projection being tangential to said hook-like portion at their junction, and guide means having a second substantially flat guide surface means forming an extension of said linear portion of said blade means adjacent said sharp pointed projection to serve as a guide for said projection and limit the depth of penetration of said projection when said projection is used in cutting.

5. An implement for skinning and dressing game animals comprising:

blade means for effecting cutting at a controlled depth including a substantially elongated blade having a linear portion and a hook-like portion at one end, handle means connected to the other end of said linear portion opposite said hook-like portion, said hook-like portion having a blunt rounded portion at the free end thereof and a sharpened inner peripheral edge portion, a substantially flat guide surface means adjacent said blunt rounded portion extending for a minor portion of and on the outer periphery of said hook-like portion, a second sharpened edge portion on the outer periphery of said hook-like portion adjacent to said flat guide surface means opposite from said blunt rounded portion, said substantially flat guide surface means to limit the depth of penetration of said second sharpened edge portion, a sharp pointed projection communicating with and forming an integral continuous extension of said hook-like portion opposite the free end thereof, the outer edge of said projection being tangential to said hook-like portion at their junction, and guide means having a second substantially flat guide surface forming an extension of said linear portion of said blade means adjacent said sharp pointed projection to serve as a guide for said projection and limit the depth of penetration of said projection when said projection is used in cutting, one peripheral edge of said linear portion of said blade having a saw tooth configuration and the other peripheral edge thereof having a sharpened edge merging with the sharpened inner periphery of said crescent-shaped portion.

References Cited by the Examiner

UNITED STATES PATENTS

| D. 153,776 | 5/1949 | Eimmerman. | |
|---|---|---|---|
| 256,700 | 4/1882 | Jincks. | |
| 732,911 | 7/1903 | Abbey. | |
| 866,308 | 9/1907 | Sanders | 30—317 |
| 1,546,975 | 7/1925 | Feller. | |
| 1,552,153 | 9/1925 | Hartbauer | 30—287 |
| 2,549,326 | 4/1951 | Moore | 30—294 X |
| 3,187,354 | 6/1965 | Frisbie | 30—294 X |

FOREIGN PATENTS

| 79,438 | 6/1955 | Denmark. |
|---|---|---|
| 148,888 | 2/1955 | Sweden. |

WILLIAM FELDMAN, *Primary Examiner.*

JAMES L. JONES, Jr., *Examiner.*